June 15, 1926. 1,588,670
G. C. FRICKE
EQUALIZING MEANS
Filed April 24, 1925
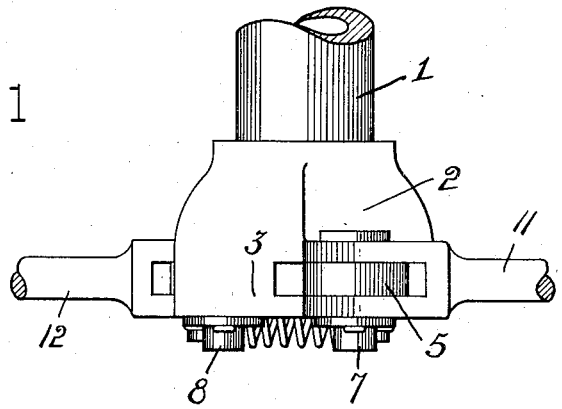
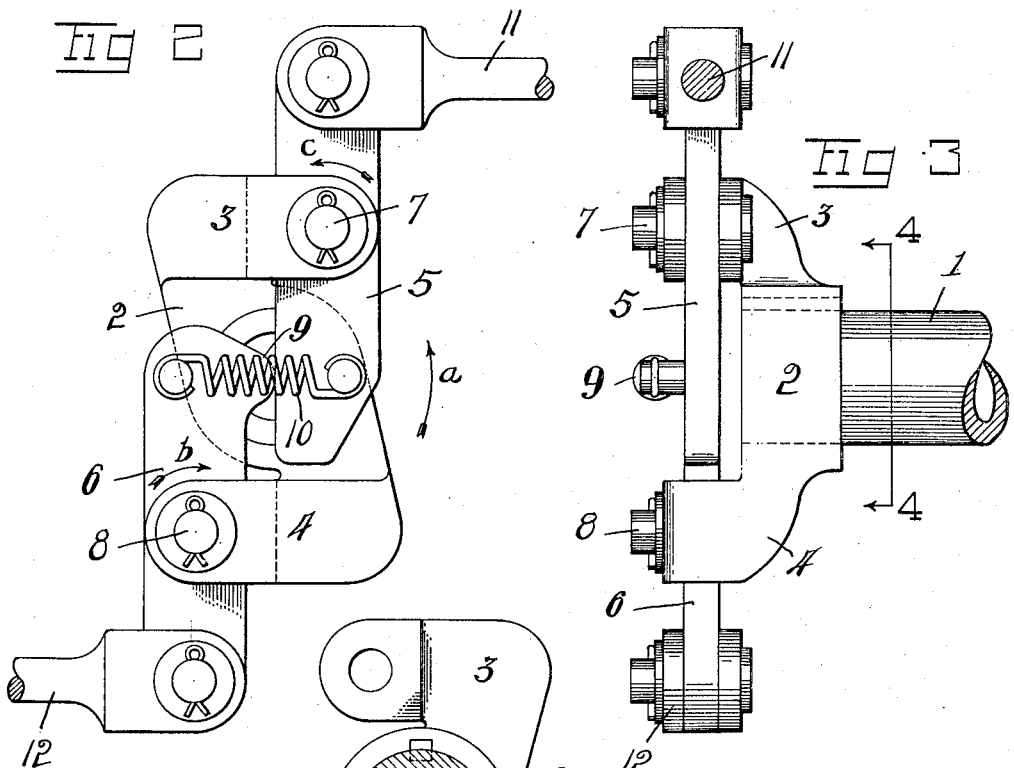
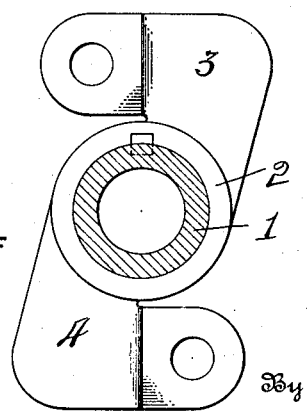
Inventor
Guy C. Fricke,
By Owen Owen & Crampton,
Attorneys.

Patented June 15, 1926.

1,588,670

UNITED STATES PATENT OFFICE.

GUY C. FRICKE, OF TOLEDO, OHIO.

EQUALIZING MEANS.

Application filed April 24, 1925. Serial No. 25,571.

This invention relates to power equalizing devices of the type in which power is transmitted from one member, by a movement thereof, to a plurality of other members adapted to move with and capable of movements relative thereto and to each other.

The object of the invention is the provision of a novel device of the character described, which is simple and efficient in its construction and intended particularly for use in connection with brake mechanisms, whereby a uniform pressure can be applied to a plurality of brakes from a common source. The invention is fully described in the following specification, and one embodiment thereof illustrated in the accompanying drawings, in which,—

Figure 1 is a top plan view of a device embodying the invention with parts broken away. Figs. 2 and 3 are end and side elevations thereof, and Fig. 4 is a section on the line 4—4 in Fig. 3.

Referring to the drawings, 1 designates a shaft which, if the equalizing device embodying the invention is to be used in connection with an automobile equipped with four wheel brakes, is journalled transversely of the automobile between the front and rear sets of brakes and is provided preferably at each end with a rocker head 2 that is keyed or otherwise fixed to the shaft to turn therewith. This rocker head is provided, in the present instance, at one side of the shaft with a bearing arm 3 and at the other side of the shaft with a bearing arm 4 disposed substantially in parallel relation with their free ends projecting in opposite directions with respect to a diametrical line of the shaft and forming forks with the openings thereof transverse to the shaft.

The forked ends of the arms 3 and 4 are disposed beyond or without the adjacent end of the shaft 1 and each has a respective lever 5, 6 fulcrumed within its fork on a respective pivot pin 7, 8. The levers 5 and 6 stand in a common plane with their inner ends projecting across the end of the shaft and connected in such manner that a rocking movement of one transverse to the shaft in one direction will impart an opposed rocking movement to the other. In the present case, this connection is obtained by having a side edge of the inner end portion of one lever in abutment with the side edge of the inner end portion of the other lever, such abutment taking place in approximately the axial line of the shaft. For the purpose of this connection, one lever is provided on its side with a rounded nose portion 9 which coacts with a straight edge portion of the other lever. A coiled contractile spring 10 connects the abutting ends of the two levers and serves merely to hold the engaging portions of the levers together and to prevent rattling when power is not being applied.

A link or connection 11 pivotally extends from the outer end of the lever 5, say to one of the brake members of the forward set, and a link or connection 12 extends from the outer end of the arm 6 to connect with the brake member of the rear set whereby a rocking of the shaft 1 in counter clockwise direction, in the present instance, will tend to apply the connected brake members of both the front and rear sets. It will be understood in practice that a similar device and connection to that above described may be mounted on the other end of the rock shaft 1 for the remaining front and rear brake members of the set.

It will also be apparent that the shaft 1 may be connected to the foot pedal or other manually controlled operating means of the machine in any suitable manner, as well understood in the art.

In the use of my equalizing device the shaft 1 is rocked in counter clockwise direction, or as indicated by the arrow $a$ to apply the brakes, and this movement imparts revoluble movements in the ame direction to the levers 5 and 6 and tends to draw the brake connection 11 to the left and the brake connection 12 to the right to apply the brake members to which connected. This turning movement of the rocker-head 2 and connected levers 5 and 6, substantially as a fixed unit, continues until a resistance to further movement is set up in one or the other of the links 11, 12 by reason of the adjustment of the brakes not being uniform and one taking hold before the other. When this resistance occurs the point of pivotal connection between the resisting link and its lever is retarded in its movement or stands substantially still and the fulcrum of the lever continues to revolve about the axis of the shaft with the rocker-head 2, thereby imparting a rocking movement to the lever in clockwise direction and imparting a corresponding opposed rocking movement to the other lever so that the brake with which such other lever is connected is caused to have substantially the same gripping action as the brake first to engage, and this occurs before the latter has been engaged to any greater extent. In other words, if the adjustment of the brakes is not uniform, the gripping action of the two brakes will be equalized as soon as one begins to take hold.

To illustrate more clearly the action which takes place, let it be presumed that upon a turning of the shaft 1 in the direction of the arrow $a$ the brake connected to the link 12 is the first to be applied. The outer end of the lever 6 will then stand still while the pivot 8 continues to move forward, thereby effecting a rocking of the lever 6 in the direction of the arrow $b$ and causing the inner end of such lever to act against the inner end of the lever 5 and to turn it on its pivot 7 in the direction of the arrow $c$, thereby taking up the play or slack in the brake with which the link 11 is connected. When the resistance to a brake applying movement of both links 11 and 12 is uniform, the levers 5 and 6 will then turn with the rocker head 2 and cause the desired application of the brakes.

I wish it understood that my invention is not limited to any specific construction, arrangement or form of the parts, as it is capable of embodiments in numerous forms without departing from the spirit of the claims.

Having thus described my invention, what I claim as new and desire to secure by Letters Patent is:

1. In a device of the class described, a rocker means, two levers fulcrumed to said means at opposite sides of its axis for turning movements therewith and pivotal movements relative thereto, said levers being connected to cause a movement of one in one direction to impart opposed movement to the other, and separate means connecting the outer ends of the levers to the respective means to which power is to be applied.

2. An equalizing device having in combination a power applying rocker means, member carried by said means for revoluble movements therewith and pivotal movements relative thereto, said members having connection whereby a pivotal movement of one in one direction relative to the rocker means will impart an opposed pivotal movement to the other member, and power transmitting means extending respectively in opposite directions from the outer ends of said member transversely thereof.

3. An equalizing device having in combination a rocker means, members carried by said means for rocking movements therewith and pivotal movements relative thereto, said members having their pivots at opposite sides of the rocking axis of said means and having their inner ends in coaction adjacent to the rocking axis of said means whereby a rocking movement of one member in one direction will impart an imposed rocking movement to the other member, and means for applying power extending from the outer end of each member transversely thereof and away from the direction of coaction of one member with the other.

4. In combination, in a device of the class described, a rock shaft, a rocker head fixed to said shaft at an end thereof and having arms projecting in opposite directions therefrom, a lever pivotally carried by each arm and having its inner end disposed at an end of the shaft and in coaction with the inner end of the other lever, whereby a rocking movement of one in one direction will impart an opposed rocking movement to the other lever, and draft means extending transversely from the outer end of each lever.

5. A power equalizing device, comprising a rotatable shaft, diametrically opposed arms secured to and extending beyond the ends of said shaft, pivoted equalizing means carried by each of said arms adapted to move independently of each other, and power transmitting means secured to said pivoted means and movable therewith when the shaft is rotated.

6. A power equalizing device, comprising a rotatable shaft, diametrically opposed arms on said shaft, levers pivoted intermediate their ends to each of said arms adapted to move independently of each other, and power transmitting means secured to said pivoted means and movable therewith when the shaft is rotated.

7. In a power equalizing device, a rotatable shaft, diametrically opposed arms on the shaft having their ends extending beyond the end of the shaft in a line extending through the axis of said shaft, a lever fulcrumed on each arm adapted to move independently of the other, means to cause said levers to move in unison with each other and power transmitting means movable with said levers when the shaft is rotated.

8. In a power equalizing device, a rotatable shaft, diametrically opposed arms on the shaft having their ends extending beyond the end of and in a line extending through the axis of said shaft, a lever fulcrumed between its ends on each arm disposed to have their inner ends overlap at points in substantial alignment with the axis of said shaft, and adapted to move independently of each other, power transmitting means secured to the outer ends of said levers and movable therewith when the shaft is rotated.

9. A power equalizing device including a rocker shaft, radially disposed arms, on said shaft, a fulcrumed lever carried by the ends of said arms and having their inner ends adapted to contact in substantial alignment with the axis of said shaft, means whereby the levers move independently of each other, and power transmitting means connected to the outer ends of said levers adapted for movement with said levers when the shaft is rocked.

10. In combination with a rocker shaft, a head on the shaft having diametrically opposed arms, a lever fulcrumed between its ends on each arm and disposed to have their inner ends overlap each other at points in substantial alignment with the axis of the shaft, a spring connecting said overlapping ends of the levers, one of the levers having a projection at its inner end engageable with the adjacent end of the other lever, and power transmitting means connected to the outer ends of the respective levers.

11. A power equalizing device comprising a rocker shaft, diametrically opposed arms on said shaft, a lever pivoted intermediate its ends to each of said arms and disposed upon opposite sides of the longitudinal axis of said rocker shaft, means whereby to effect movement of the arms and power transmitting means secured to said levers and movable therewith when the shaft is rocked.

12. A power equalizing device comprising a rocker shaft, diametrically opposed arms on said shaft, independently movable levers pivoted intermediate their ends to the said arms and disposed respectively upon opposite sides of the longitudinal axis of said rocker shaft, one end of said lever having wiping contact with a part of the opposed lever, spring means adapted to effect said contact of the levers, and power transmitting means secured to and movable with the levers when the shaft is rotated.

In testimony whereof I have hereunto signed my name to this specification.

GUY C. FRICKE.